United States Patent [19]

Fennern

[11] Patent Number: 5,082,620
[45] Date of Patent: Jan. 21, 1992

[54] BWR PARALLEL FLOW RECIRCULATION SYSTEM

[75] Inventor: Larry E. Fennern, San Jose, Calif.

[73] Assignee: General Electric Coompany, San Jose, Calif.

[21] Appl. No.: 699,428

[22] Filed: May 13, 1991

[51] Int. Cl.$^5$ ............................................. G21C 15/22
[52] U.S. Cl. .................... 376/373; 376/406; 376/372; 376/407
[58] Field of Search ............... 376/372, 373, 377, 406, 376/407

[56] References Cited

U.S. PATENT DOCUMENTS

| | | | |
|---|---|---|---|
| 3,429,775 | 2/1969 | Peterson | 376/372 |
| 3,437,559 | 4/1969 | Junkermann et al. | 376/406 |
| 3,445,335 | 5/1969 | Gluntz | 376/407 |
| 3,621,926 | 11/1974 | Townsend | 376/372 |
| 3,838,002 | 9/1974 | Gluntz et al. | 376/407 |
| 4,033,814 | 7/1977 | Bregeon et al. | 376/407 |
| 4,663,116 | 5/1987 | Masuhara et al. | 376/377 |
| 4,696,792 | 9/1987 | Hobson | 376/377 |
| 4,847,043 | 7/1989 | Gluntz | 376/372 |
| 4,879,087 | 11/1989 | Akiyama et al. | 376/216 |

OTHER PUBLICATIONS

Wilkins et al., *Advanced BWR: Design Improvements Build on Proven Technology*, Nuclear Engineering International, reprint Jun. 1986, pp. 1-7 and drawing entitled "The World's Reactors No. 89".

T. Baumeister, *Standard Handbook For Mechanical Engineers*, 1967, Title and copyright pages, and pp. 14-16 through 14-19.

Foster et al., "Basic Nuclear Engineering", 1977, pages: cover, copyright, 436-439 and 443-446.

*Primary Examiner*—Brooks H. Hunt
*Assistant Examiner*—Frederick H. Voss
*Attorney, Agent, or Firm*—Robert R. Schroeder

[57] ABSTRACT

A recirculation system for a boiling water reactor includes a plurality of circumferentially spaced impeller-driven reactor internal pumps disposed in a downcomer for pumping a first portion of reactor coolant, and a plurality of circumferentially spaced fluid-driven jet pumps disposed in the downcomer for pumping a remaining portion of the coolant in the downcomer. In an exemplary embodiment, the jet pumps are driven by a portion of feedwater provided to the reactor.

12 Claims, 2 Drawing Sheets

BWR PARALLEL FLOW RECIRCULATION SYSTEM

TECHNICAL FIELD

The present invention relates generally to boiling water reactors, and, more specifically, to a coolant recirculation system therefor.

BACKGROUND ART

A boiling water reactor (BWR) conventionally includes in serial flow communication a lower plenum, a reactor core, an upper plenum, a steam separator, and a steam dryer disposed within a reactor pressure vessel. Typically surrounding the core is an annular shroud spaced radially inwardly from the pressure vessel to define an annular downcomer. The pressure vessel is partially filled with a reactor coolant, such as water, to a level above the reactor core. The reactor coolant enters the core from the lower plenum and is heated thereby which decreases its density and therefore causes it to rise upwardly. The water is heated by the core for generating steam which is separated from moisture in the steam separator and the steam dryer, and is discharged from the pressure vessel through an outlet nozzle for flow to a conventional steam turbine for powering an electrical generator for example.

Condensed steam from the turbine is pressurized by a conventional feedwater pump and returned to the pressure vessel through a conventional feedwater sparger disposed therein for mixing in the downcomer the relatively cool feedwater with the hot reactor coolant. The reactor coolant is thereby cooled which increases its density, and it thereby falls by gravity in the downcomer to the lower plenum for completing the recirculation loop. Since this natural, gravity-driven recirculation of the reactor coolant, based on the difference in temperature of the reactor coolant in the downcomer and in the core, has a relatively low flowrate, reactors typically include systems for forcing recirculation of the coolant flow within the vessel.

For example, conventional jet pumps include a nozzle for ejecting a driving fluid as a jet into a mixer and in turn into a diffuser which draws by suction into the mixer a portion of the reactor coolant in the downcomer for providing forced recirculation. The nozzle is provided with the driving fluid from a driving pump located externally of the pressure vessel, and through corresponding supply pipes extending through the pressure vessel in flow communication with respective jet pumps. An outlet from the pressure vessel is joined to the driving pump by a suitable supply pipe for providing thereto a portion of the reactor coolant for being pressurized.

Such jet pumps are generally undesirable since they require the external driving pump and piping loops which add to the complexity of the system, increase the number of welds required in manufacturing the system, and must be suitably configured for containing radiation due to the recirculating coolant therein. Furthermore, the inlets and outlet required in the vessel for channeling the flow to and from the jet pumps also provide additional sources for potential leakage of the reactor coolant, and are typically located below the top of the reactor core which could uncover the reactor core in a leakage incident.

Whereas the jet pumps are fluid-driven and require the driving pump and external piping, conventional reactor internal pumps (RIPs) are impeller-driven and may be contained within the reactor pressure vessel thusly eliminating the external loops and the driving pump used for jet pumps, and the attendant problems associated therewith. The RIPs also provide improved control of the flow of reactor coolant through the core by using conventional adjustable speed drives.

However, tradeoffs are required in a RIP recirculation system. For example, in a pump trip situation where all of the RIPs are rendered inoperable, the RIPs provide a large forward resistance to the natural recirculation of the reactor coolant down the downcomer which reduces the core inlet flow substantially and may result in unstable, or oscillatory, flow in the reactor core unless the core power level is reduced, for example, by inserting control rods. Accordingly, contingency measures are typically included in the design to exclude unstable operation, and the complexity of the overall system is thereby increased.

Furthermore, upon pump trip, the RIPs coast down very rapidly due to their low rotary inertia and therefore a similarly rapid reduction in core flow occurs. Upon occurrence of the pump trip, the reactor is also scrammed, but, however, the heating ability of the nuclear fuel cannot be instantaneously stopped and therefore the reactor coolant continues to be heated thereby. With the reduced core flow, transition boiling may occur where the reactor coolant is heated for forming a steam film around the fuel assemblies instead of nucleate bubbles which can overheat the cladding surrounding the fuel rods in the fuel assemblies potentially leading to damage thereof or shortened lifetimes.

In order to prevent the occurrence of transition boiling in a pump trip situation, redundant and independent power supplies may be employed to reduce the probability of an all pump trip, or inertia may be built into the system by adding mass to the RIPs. Or, in another embodiment, conventional motor-generator sets may be used as a power supply source for some of the RIPs. The electrically driven motor-generator set in turn provides electricity to the RIPs, and, in the event of a pump trip, the motor-generator sets have sufficient additional inertia for slowing the coast down of the RIPs connected thereto for reducing, or eliminating, transition boiling.

OBJECTS OF THE INVENTION

Accordingly, one object of the present invention is to provide a new and improved recirculation system for a boiling water reactor.

Another object of the present invention is to provide a coolant recirculation system having increased natural recirculation in the event of a pump trip occurrence.

Another object of the present invention is to provide a coolant recirculation system effective for reducing, or eliminating, transition boiling in the event of a pump trip occurrence.

Another object of the present invention is to provide a coolant recirculation system which is relatively simple in configuration with good control characteristics.

DISCLOSURE OF INVENTION

A recirculation system for a boiling water reactor includes a plurality of circumferentially spaced impeller-driven reactor internal pumps disposed in a downcomer for pumping a first portion of reactor coolant, and a plurality of circumferentially spaced fluid-driven jet pumps disposed in the downcomer for pumping a remaining portion of the coolant in the downcomer. In an exemplary embodiment, the jet pumps are driven by a portion of feedwater provided to the reactor.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
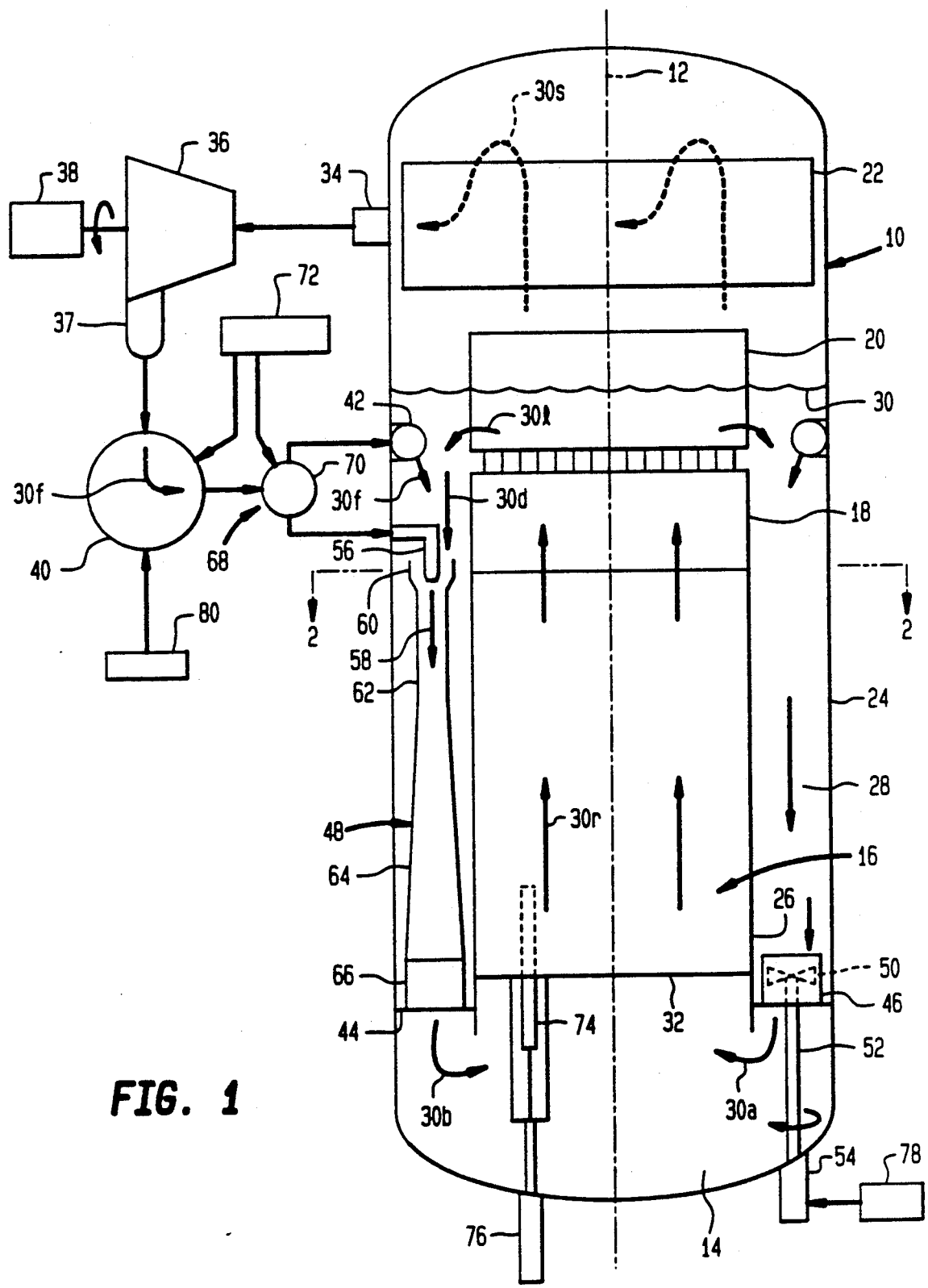
FIG. 1 is a schematic, elevational sectional view of an exemplary boiling water reactor including a coolant recirculation system in accordance with one embodiment of the present invention.

Illustrated in FIG. 1 is an exemplary boiling water reactor (BWR) 10 having disposed in serial flow communication about a longitudinal centerline axis 12 conventional components including a lower plenum 14, a reactor core 16, an upper plenum 18, a steam separator 20, and a steam dryer 22 disposed inside a generally cylindrical reactor pressure vessel 24 having bottom and top pressure heads. Surrounding the core 16 is a conventional cylindrical core shroud 26 spaced radially inwardly from the vessel 24 to define a conventional annular downcomer 28.

The vessel 24 is partially filled with a reactor coolant 30, such as water, to a level above the core 16. The coolant 30 enters the core 16 at a bottom inlet 32 thereof from the lower plenum 14 and is heated by the nuclear fuel in the core 16 which decreases its density and thereby causes it to rise as designated by the rising flow arrows 30r. The rising coolant 30r is also heated to generate steam and forms a conventional water/steam mixture wherein the volume of steam relative to the volume of water is conventionally known as the steam void fraction. The steam void fraction increases as the rising coolant 30r is heated along its upward path in the core 16, and the moisture is removed therefrom in the steam separator 20 and steam dryer 22 for generating relatively dry steam designated 30s.

The steam 30s is discharged from the vessel 24 through an outlet nozzle 34 and is conventionally channeled to a conventional steam turbine 36 which rotates a conventional electrical generator 38, for example. The steam 30s is condensed in a conventional condenser 37 and forms feedwater 30f which is pressurized by a conventional feedwater pump 40 and channeled to a conventional feedwater sparger 42 disposed in the vessel 24 and in the downcomer 28. The feedwater 30f is mixed with the liquid 30 separated from the rising coolant 30r at the end of its travel through the steam separator 20 thusly reducing its temperature and increasing its density which therefore falls by gravity downwardly in the downcomer 28 as shown by the falling downcomer reactor coolant 30d.

In order to increase the recirculation of the reactor coolant 30 within the vessel 24, a recirculation system in accordance with one embodiment of the present invention is provided and includes an annular pump deck 44 disposed in the downcomer 28 and fixedly joined to the vessel 24 and the core shroud 26 at the bottom of the core 16 adjacent to the core inlet 32. A plurality of circumferentially spaced, conventional impeller-driven reactor internal pumps (RIPs) 46 are disposed in the downcomer 28 and conventionally fixedly secured to the pump deck 44 for pumping a first portion of the reactor coolant 30 in the downcomer downwardly as RIP discharge flow 30a into the lower plenum 14 for flow into the core inlet 32. A plurality of circumferentially spaced, fluid-driven jet pumps (JPs) 48 are also disposed in the downcomer 28 and conventionally fixedly joined to the support deck 44 for pumping a remaining, second portion of the reactor coolant 30 in the downcomer 28 downwardly as JP discharge flow 30b into the lower plenum 14 and in turn into the core inlet 32 in parallel flow with the RIP discharge flow 30a.

Figure 2:
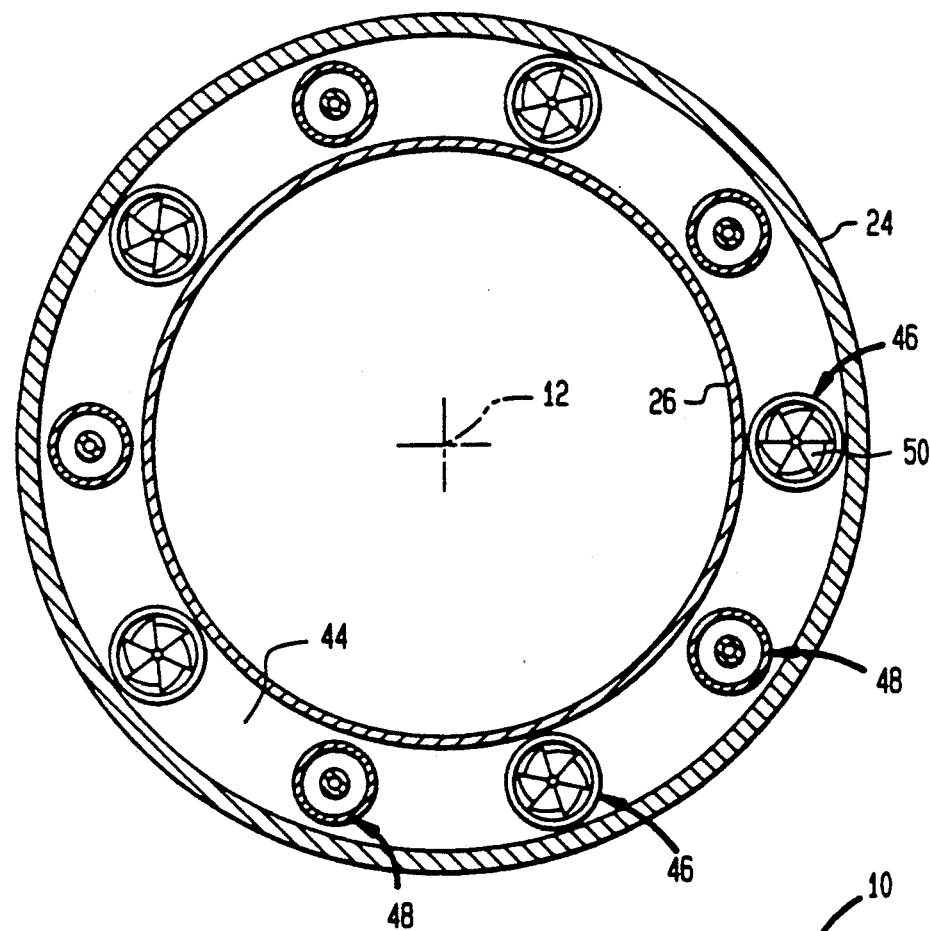
FIG. 2 is a transverse sectional view of the reactor illustrated in FIG. 1 taken along line 2—2.

As shown in FIG. 2, the RIPs 46 are preferably equidistantly spaced between adjacent ones of the JPs 48 for ensuring a uniform flow of the reactor coolant 30 from the downcomer 28, through the pump deck 44 and into the lower plenum 14 for flow to the core inlet 32.

As shown in FIGS. 1 and 2, the conventional RIPs 46 each includes an impeller 50 fixedly joined to a drive shaft 52 which extends downwardly through the lower plenum 14 and through the bottom head of the vessel 24 to a conventional motor 54 for selectively and variably driving the impeller 50 for controlling the flowrate of the RIP discharge flow 30a therefrom.

As illustrated in FIG. 1, each of the JPs 48 includes a conventional nozzle 56 for ejecting a JP driving fluid 58 as a jet into a conventional inlet 60 which receives the jet 58 and the second portion of the downcomer coolant 30d. A conventional cylindrical mixer 62 extends downwardly from the JP inlet 60 for mixing the jet 58 and the downcomer coolant second portion which flows to a conventional diverging diffuser 64 extending downwardly from the JP mixer 62 which diffuses the mixed jet 58 and downcomer coolant second portion. A cylindrical JP outlet 66 extends downwardly from the JP diffuser 64 for discharging the mixed and diffused jet 58 and downcomer coolant second portion as the JP discharge flow 30b.

The operation of the JPs 48 is conventional with the jet 58 creating a suction pressure at the JP inlet 60 for drawing therein the downcomer coolant second portion. The JP diffuser converts the kinetic energy of the jet 58 mixed with the reactor coolant to an increase in static pressure thereof at reduced velocity.

One advantage of using both the RIPs 46 and the JPs 48 in a single recirculation system for the reactor 10 is that in the event of an all-pump trip, increased natural recirculation core flow by gravity is obtained since the downcomer coolant 30d may flow through the inoperable JPs 48 with substantially less forward flow resistance than through the inoperable RIPs 46. In this way the advantages of using RIPs 46 may be maintained while additionally providing increased core flow through the JPs 48 in the all-pump trip.

Although a conventional external driving pump and related external piping could be used for driving the JPs 48, a considerable reduction in overall system complexity may be obtained by driving the JPs 48 by other means including using the feedwater 30f or the steam 30s as the JP driving fluid 58. In accordance with one embodiment of the present invention, each of the JPs 48 includes means 68 for supplying the JP driving fluid 58 to the JP nozzle 56.

In a preferred embodiment of the invention as illustrated in FIG. 1, the JP driving fluid, or feedwater, driving means 68 includes the feedwater driving pump 40 for pressurizing the feedwater 30f, a conventional flow control valve 70 disposed in flow communication with the feedwater pump 40, the feedwater sparger 42 disposed inside the pressure vessel 24 and in flow communication with the flow control valve 70, with the control valve 70 also being disposed in flow communication with the JP nozzles 56 in parallel flow with the feedwater sparger 42. A conventional controller 72 is operatively connected to the feedwater pump 40 and the flow control valve 70 for varying the flow rate of the feedwater 30f and the split of the feedwater 30f between the sparger 42 and the JP nozzles 56.

By using a portion of the feedwater 30f as the JP driving fluid 58 for powering the JPs 48, the conventionally required separate driving fluid pump is eliminated, along with all the associated external piping required therefor. The flow control valve 70 may be optionally located inside the vessel 24 and may be provided with the feedwater 30f from the pump 40 by a single conventional conduit and conventional feedwater inlet nozzle through the vessel 24 so that there is no additional external piping loops required for powering the JPs 48. The JP nozzles 56 and the inlets 60 are preferably disposed above the reactor core 16 so that in the event of any breaks in the line feeding the JP nozzle 56, the coolant level within the core shroud 26 is disposed, or remains above the top of the core 16.

In this feedwater driven embodiment of the invention, the feedwater flow 30f is automatically increased in response to increased demand of the steam flow 30s, and, therefore, recirculation flow of the coolant 30 inside the vessel 24 is necessarily increased. Accordingly, as more steam 30s is generated by the reactor 10, thus requiring increased recirculation flow, more of the steam 30s is condensed in the turbine 36 for increasing the volume of the feedwater 30f which in turn increases the amount of feedwater 30f channeled to the sparger 42 and the JP nozzle 56. The split of the feedwater 30f between the sparger 42 and the JP nozzles 56 may be determined for each particular design, and the flow thereof to the JP nozzles 56 may be increased with a decrease of the flow to the sparger 42 or vice versa.

However, the feedwater driven JPs 48 have difficulty in matching steam flow 30s, feedwater flow 30f, and the recirculation flow of the coolant 30r through the core 16 for off-rated reactor conditions. In part, these difficulties relate to the rather high proportion of feedwater flow which must be directed to the nozzles of the JPs 48, typically 80% of the total feedwater flow for a recirculation system composed solely of feedwater driven jet pumps. Furthermore, the feedwater driven JPs 48 have difficulty alone in accommodating plant upset or transient conditions that require independent control of the coolant water level 30 in the vessel 24 and the flowrate of the coolant into the core inlet 32.

For example, in a trip shutdown of the reactor 10 from a power producing condition, which may occur after a trip of the turbine 36, conventional control rods 74, only one of which is illustrated, are inserted into the core 16 by conventional control rod drives 76 to decrease reactivity in the core 16 to shut down the reactor 10. However, during the transient interval immediately following the trip, which may occur for a few seconds, the core flow in a conventional reactor is independently decreased to slow the drop in level of coolant 30 as steam voids collapse and are displaced in the core 16 and for increasing the void fraction of the rising coolant 30r to further control coolant level 30 and decrease reactivity in the core 16. At the same time, the flow of the feedwater 30f is also conventionally increased when possible to maintain or increase the level of the coolant 30 in the reactor 10 to accommodate the level decrease of the coolant 30 and for ensuring a safe shutdown. This independent ability to both quickly decrease the core flow while increasing the feedwater flow in such a transient condition is not readily available from the feedwater driven JPs 48 alone.

However, the present invention as described above which includes both the JPs 48 and the RIPs 46 maintains this ability since the JPs 48 and the sparger 42 may be used for maintaining or increasing the level of the coolant 30 within the vessel 24, with the RIPs 46 being used independently to rapidly decrease the core flow through the core inlet 32 by decreasing the speed of the impellers 50. The ability to independently operate both the JPs 48 and the RIPs 46 provides an increase in the ability to match flows of the steam 30s, feedwater 30f, and recirculation 30r through the core 16 at off-rated conditions as well.

Accordingly, in a trip of the reactor 10, the JPs 48 are effective for maintaining and increasing water level in the pressure vessel 24 while the RIPs 46 are effective for decreasing total flow of the reactor coolant into the core inlet 32 for increasing steam void fraction in the core 16 for maintaining the level of coolant 30 and decreasing reactivity of the core 16.

The JPs 48 provide a portion of the feedwater 30f into the vessel 24 and provide a portion, i.e. JP discharge flow 30b, of the total core inlet flow 30r channeled upwardly through the core 16, with the remainder of the core inlet flow being provided by the RIPs 46, i.e. RIP discharge flow 30a. The ratio of the number of the feedwater driven JPs 48 to the RIPs 46 may be determined for each particular design and depend on the proportion of flow desired to be provided by the feedwater driven JPs 48 at rated and off-rated (e.g. natural circulation flow) conditions, as well as tradeoffs on the feedwater pump head requirement. Typically half of the recirculation pumps are feedwater driven JPs 48 and half are RIPs 46, although any appropriate ratio may be used. The JPs 48 are interspaced between the RIPs 46 as illustrated in FIG. 2 to ensure a more uniform distribution of core flow through the core inlet 32 during operation.

In a preferred embodiment of the invention, the RIPs 46 and the JPs 48 have diverse or independent motive power sources to reduce the likelihood of simultaneous loss of function thereof while allowing independent operation thereof. For example, the motors 54 powering the RIPs 46 are preferably provided with a conventional first power supply 78 while the feedwater pump 40 is provided with a separate or diverse conventional second power supply 80, and therefore the JPs 48 are separately powered from the RIPs 46. For example, some feedwater pumps 40 may be steam driven using a steam turbine, whereas RIPs 46 are electrically driven.

Furthermore, the likelihood of transition boiling during a transient reactor trip is substantially reduced, if not eliminated, by utilizing both the JPs 48 and the RIPs 46. Each of the RIPs 46 has an RIP flow inertia which is conventionally relatively low. The RIP flow inertia is simply the inertia of the RIP discharge flow 30a which is due in large part to the rotational inertia of the impeller 50. When the RIP 46 trips, the impeller 46 coasts to a stop relatively quickly and the RIP discharge flow 30a also decreases relatively quickly. In an all RIP 46 recirculation system, such relatively low RIP flow inertia increases the likelihood of transition boiling in a reactor trip as is conventionally known and suitable conventional accommodations must be made therefor. For example, some of the RIPs 46 in a conventional reactor, may be separately powered by a conventional motor-generator set for increasing the RIP flow inertia to delay coast down during the trip event. Or, alternatively, mass may be added to the impeller 50 or drive shaft 52 for increasing its rotational inertia to increase the RIP flow inertia.

In accordance with one object of the present invention, each of the JPs 48 has a JP flow inertia which is predeterminedly greater than the RIP flow inertia. This may be accomplished, for example, by sizing the feedwater driving pump 40 for effecting the JP flow inertia greater than the RIP flow inertia. The feedwater driving pump 40 is typically a relatively large pump having a relatively large driving motor on the order of about 500 shaft horsepower. Upon tripping of the feedwater driving pump 40, the inertia thereof allows the pump 40 to continue to pump at decreasing rates as it coasts down, which, in turn, continues to pump the JP discharge flow 30b from the JPs 48.

Accordingly, in the event of an all RIP 46 trip, the JPs 48 continue to operate and maintain a core flow through the inlet 32, which although being less than the total core flow with the RIPs 46 operational is sufficient for preventing transition boiling in the core 16. Similarly, in the event of an all JP 48 trip, the RIPs 46 continue to operate for providing core flow into the inlet 32 similarly at a reduced level but suitable for preventing transition boiling in the core 16. And, in the event of an all pump trip including both the RIPs 46 and the JPs 48, the larger JP flow inertia itself may be used for preventing transition boiling independently of the RIPs 46. Furthermore, the motor-generator sets which might otherwise be used with the RIPs 46, or the additional rotor mass added thereto, may be eliminated for reducing the complexity and cost of the overall system, relying instead on the JPs 48 for providing the required core flow during the all pump trip condition to prevent transition boiling.

Accordingly, an all pump trip of the RIPs 46 and the JPs 48 becomes a relatively mild transient condition which will not result in transition boiling. Furthermore, plant stability margin under natural recirculation in the all pump trip condition is increased due to the higher core flow provided by the JPs 48, and it is not necessary to implement a stability exclusion region under partial pump trip or natural recirculation flow conditions in the power map of the reactor 10. Yet further, conventional motor-generator sets may be eliminated from the RIPs 46 as above described, and the need for automatic insertion of the control rods 74 under low core flow conditions to avoid unstable operating regimes may also be eliminated. Improved recovery from plant upset or transient conditions may be obtained as above described.

Figure 3:
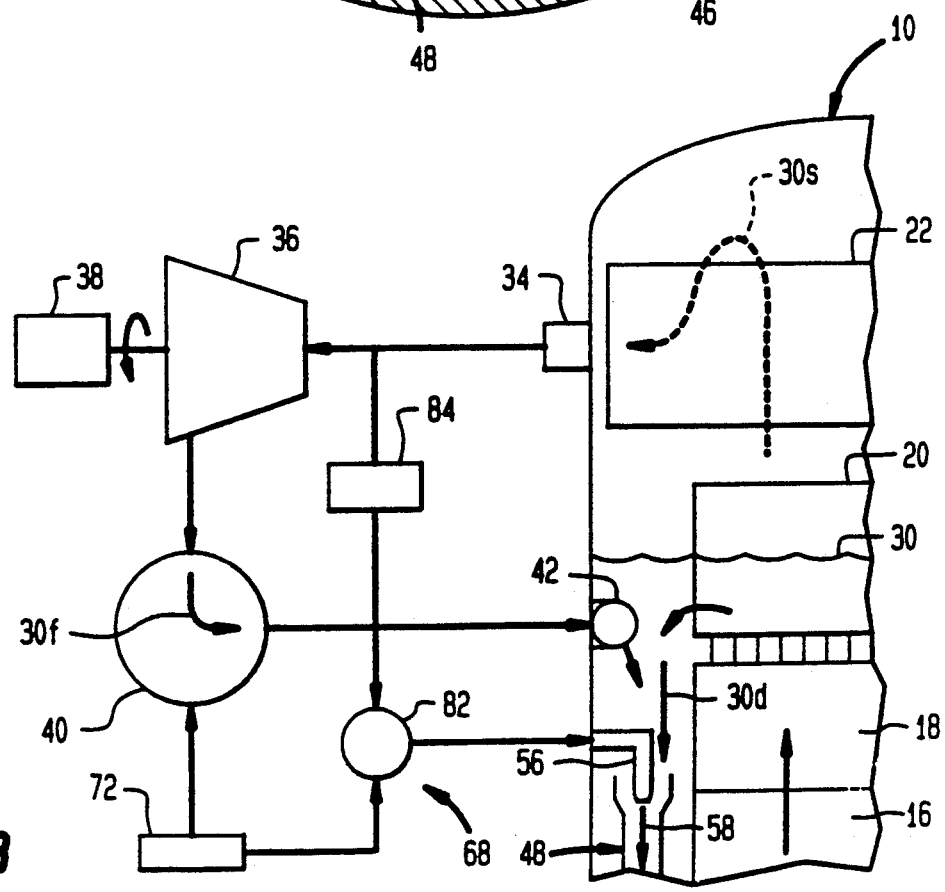
FIG. 3 is a schematic representation of a portion of the reactor illustrated in FIG. 1 showing a coolant recirculation system in accordance with another embodiment of the present invention.

Illustrated in FIG. 3 is an alternate embodiment of the coolant recirculation system. In this embodiment, the JP driving fluid 58 is steam, which, for example, may be a portion of the steam 30s channeled from the reactor outlet nozzle 34 to the steam turbine 36. The feedwater pump 40 is conventionally joined to solely the feedwater sparger 42, and the JP driving fluid, or steam, supplying means 68 are disposed in flow communication with the outlet nozzle 34 of the reactor 10 for receiving a portion of the steam 30s discharged therefrom for flow to the JP nozzles 56. The steam supplying means 68 include in this embodiment a conventional steam control valve 82 connected in flow communication between the JP nozzles 56 and the outlet nozzle 34, and operatively connected to the controller 72 for varying the steam flowrate therethrough. The steam supplying means 68 preferably include conventional means 84 for reheating the steam 30s received from the outlet nozzle 34 for raising the temperature of the steam 30s to increase its energy for flow to the JP nozzles 56. Alternatively, steam and feedwater can be premixed in a nozzle mixing section located upstream of the jet pump body, as conventionally known, to condense the steam and convert heat energy to kinetic energy in the form of a high velocity jet used as drive flow.

By utilizing steam as the JP driving fluid 58, another arrangement for obtaining diverse motive power for the JPs 48 as compared to the RIPs 46 is obtained, including the various benefits therefrom as described above.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A recirculation system for a boiling water reactor having a cylindrical shroud surrounding a reactor core and spaced radially inwardly from a pressure vessel to define an annular downcomer for channeling downwardly a recirculation reactor coolant into an inlet of the core disposed at a lower plenum of the vessel comprising:

an annular pump deck disposed in said downcomer and fixedly joined to said pressure vessel and said core shroud;

a plurality of circumferentially spaced impeller-driven reactor internal pumps (RIPs) disposed in said downcomer and joined to said pump deck for pumping a first portion of said coolant in said downcomer downwardly through said pump deck and into said lower plenum as RIP discharge flow to said core inlet; and a plurality of circumferentially spaced fluid-driven jet pumps (JPs) disposed in said downcomer and joined to said pump deck for pumping a second portion of said coolant in said downcomer downwardly through said pump deck and into said lower plenum as JP discharge flow to said core inlet in parallel flow with said RIP discharge flow.

2. A recirculation system according to claim 1 wherein said RIPs and said JPs have diverse motive power sources for preventing simultaneous tripping thereof.

3. A recirculation system according to claim 2 wherein each of said RIPs has an RIP flow inertia, and each of said JPs has a JP flow inertia greater than said RIP flow inertia.

4. A recirculation system according to claim 3 wherein each of said JPs includes:
   a nozzle for ejecting a JP driving fluid as a jet;
   an inlet for receiving said JP driving fluid jet and said downcomer coolant second portion;
   a mixer for mixing said jet and said coolant second portion;
   a diffuser for diffusing said mixed jet and coolant second portion;
   an outlet for discharging said mixed and diffused jet and coolant second portion through said pump deck and into said lower plenum as said JP discharge flow; and
   means for supplying said JP driving fluid to said nozzle.

5. A recirculation system according to claim 4 wherein said JP nozzle and inlet are disposed above said reactor core.

6. A recirculation system according to claim 4 wherein said JP driving fluid is steam.

7. A recirculation system according to claim 6 wherein said steam supplying means are disposed in flow communication with a steam outlet nozzle of said boiling water reactor for receiving a portion of steam discharged from said boiling water reactor for flow to said JP nozzle as said JP driving fluid.

8. A recirculation system according to claim 7 wherein said steam supplying means include means for reheating said steam from said outlet nozzle for raising the temperature of said steam for flow to said JP nozzle.

9. A recirculation system according to claim 4 wherein said JP driving fluid is feedwater.

10. A recirculation system according to claim 9 wherein said feedwater supplying means include:
    a feedwater driving pump for pressurizing said feedwater;
    a flow control valve disposed in flow communication with said feedwater pump;
    a feedwater sparger disposed inside said pressure vessel and in flow communication with said flow control valve; and
    said flow control valve being disposed in flow communication with said JP nozzles in parallel flow with said feedwater sparger.

11. A recirculation system according to claim 10 wherein said feedwater driving pump is sized for effecting said JP flow inertia greater than said RIP flow inertia.

12. A recirculation system according to claim 10 wherein in a trip of said boiling water reactor, said JPs are effective for maintaining and increasing water level in said pressure vessel while said RIPs are effective for decreasing total flow of said reactor coolant into said core inlet for increasing steam void fraction in said core for decreasing reactivity of said core.

* * * * *